United States Patent [19]

Kojima et al.

[11] Patent Number: 4,473,109
[45] Date of Patent: Sep. 25, 1984

[54] AIR CONDITIONING CONTROL APPARATUS FOR AUTOMOTIVE VEHICLES

[75] Inventors: Yasufumi Kojima, Gifu; Michihiko Kamiya, Handa; Kazuaki Takemoto, Anjo, all of Japan

[73] Assignee: Nippondenso Co., Ltd., Kariya, Japan

[21] Appl. No.: 405,576

[22] Filed: Aug. 5, 1982

[30] Foreign Application Priority Data

Aug. 7, 1981 [JP] Japan .............................. 56-124239

[51] Int. Cl.³ .......................... F24F 7/00; B60H 1/00
[52] U.S. Cl. ...................................... 165/12; 165/22; 165/42; 62/244; 237/5
[58] Field of Search ................... 165/22, 30, 41, 42, 165/43, 12; 62/239, 243, 244; 237/2 A, 5, 12.3 A, 12.3 C, 34

[56] References Cited

U.S. PATENT DOCUMENTS 3,984,224 10/1976 Dawkins .............................. 62/243
4,051,691 10/1977 Dawkins .............................. 62/243
4,364,513 12/1982 Tsuzuki et al. ....................... 165/43

FOREIGN PATENT DOCUMENTS 64735 5/1977 Japan ................................... 237/2 A
4415 1/1982 Japan ................................... 165/42
2033073 5/1980 United Kingdom .................. 165/42

Primary Examiner—Allen M. Ostrager
Attorney, Agent, or Firm—Cushman, Darby & Cushman

[57] ABSTRACT

A control apparatus has input devices, actuators and a single chip microcomputer and is applied to control air conditioning units carried in a cab-over wagon or a one-box car. The thermal loads of the compartment sections to be air conditioned are determined by the microcomputer on the basis of informations from the input devices and calculations in accordance with the control programs written in the microcomputer. The thermal loads of the compartment sections and the desired temperatures thereof are considered in the microcomputer, which outputs various command signals into the actuators so as to actuate front and rear air conditioning units to maintain the compartment sections to be air conditioned at the desired temperatures.

5 Claims, 8 Drawing Figures

AIR CONDITIONING CONTROL APPARATUS FOR AUTOMOTIVE VEHICLES

BACKGROUND OF THE INVENTION

1. Field of the Invention

The present invention realtes to a control apparatus for controlling an air conditioning apparatus suitable for air conditioning of a passsenger compartment of an automotive vehicle, and more particularly to a contrtol apparatus for controlling individually or simultaneously air conditioning units each provided in first and second compartment sections into which the passenger compartment to be air-conditioned is separated.

2. Description of the Prior Art

An apparatus for air conditioning an automotive passenger compartment composed of first and second compartment sections to be air-conditioned is well known. The air conditioning apparatus comprises a first air conditioning unit having an adjustable air conditioning capacity and provided in the first air conditioning section disposed in a front portion of the automotive passenger compartment, a second air-conditioning unit having an adjustable air cooling capacity and provided in the second air conditioning section disposed in a rear portion of the passenger compartment, and a third air conditioning unit having an adjustable air heating capacity and provided in the second air conditioning section.

Conventionally, in the air conditioning apparatus of such type, the operation and the adjustment of the air conditioning capacity of the respective air conditioning units are carried out manually and individually. In the prior art air conditioning manner, in case that the passenger compartment is excessively cooled down or heated up, the respective air conditioning unit must be manually operated or inoperated, or the air conditioning capacity thereof must be manually changed in compliance with a variation in the air condition. Accordingly, the manual operation must be made frequently and hence it is difficult to constantly maintain the compartment temperature at a suitable level.

SUMMARY OF THE INVENTION

An object of the present invention is to overcome the above noted drawback.

Another object of the invention is to provide a control apparatus in which it is permitted for a passenger in a first compartment section located on the front side of the vehicle to control an air conditioning of a second compartment section located on the rear side of the automotive vehicle.

To this end, the present invention provides a control apparatus adapted to an air conditioning unit for a passenger compartment of an automotive vehicle consisting of two compartment sections, said air conditioning unit provided with a first air conditioning apparatus located in a first compartment section having variable cooling and heating capacities, a second air conditioning apparatus located in a second compartment section having variable cooling capacity, and a third air conditioning apparatus located in the second compartment section having variable heating capacity, said control apparatus controlling temperatures of the compartment sections and comprising: a first sensing means for measuring an actual temperature in the first compartment section; second sensing means for measuring an actual temperature in the second compartment section; first set means for setting a required temperature in the first compartment section; second set means for setting required temperature in the second compartment section; means deciding the compartment section to be controlled; a microcomputer inputting thereinto at least output signals from the first and second sensing means, the first and second set means and the deciding means and individually operating and outputting a first controlled variable signal by which said actual temperature in the first compartment section is brought close to the required temperature therein and a second controlled variable signal by which said actual temperature in the second compartment section is brought close to the required temperature therein, and means for actuating said first, second and third air conditioning apparatus in accordance with the controlled variable signals from said microcomputer.

Features and advantages of the present invention will more clearly be understood by the following description with reference to the accompanying drawings.

DETAILED DESCRIPTION OF THE PREFERRED EMBODIMENTS

Figure 1:
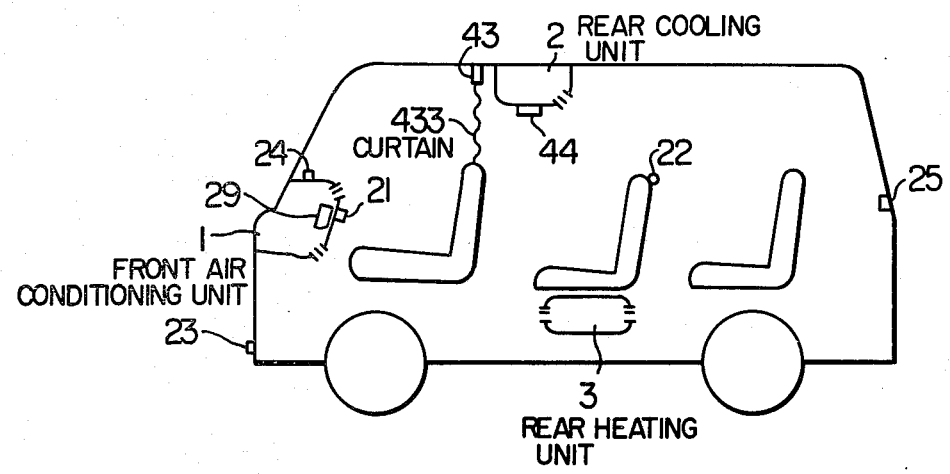
FIG. 1 is a schematic sectional view showing an arrangement of air conditioning apparatus.
Figure 2:
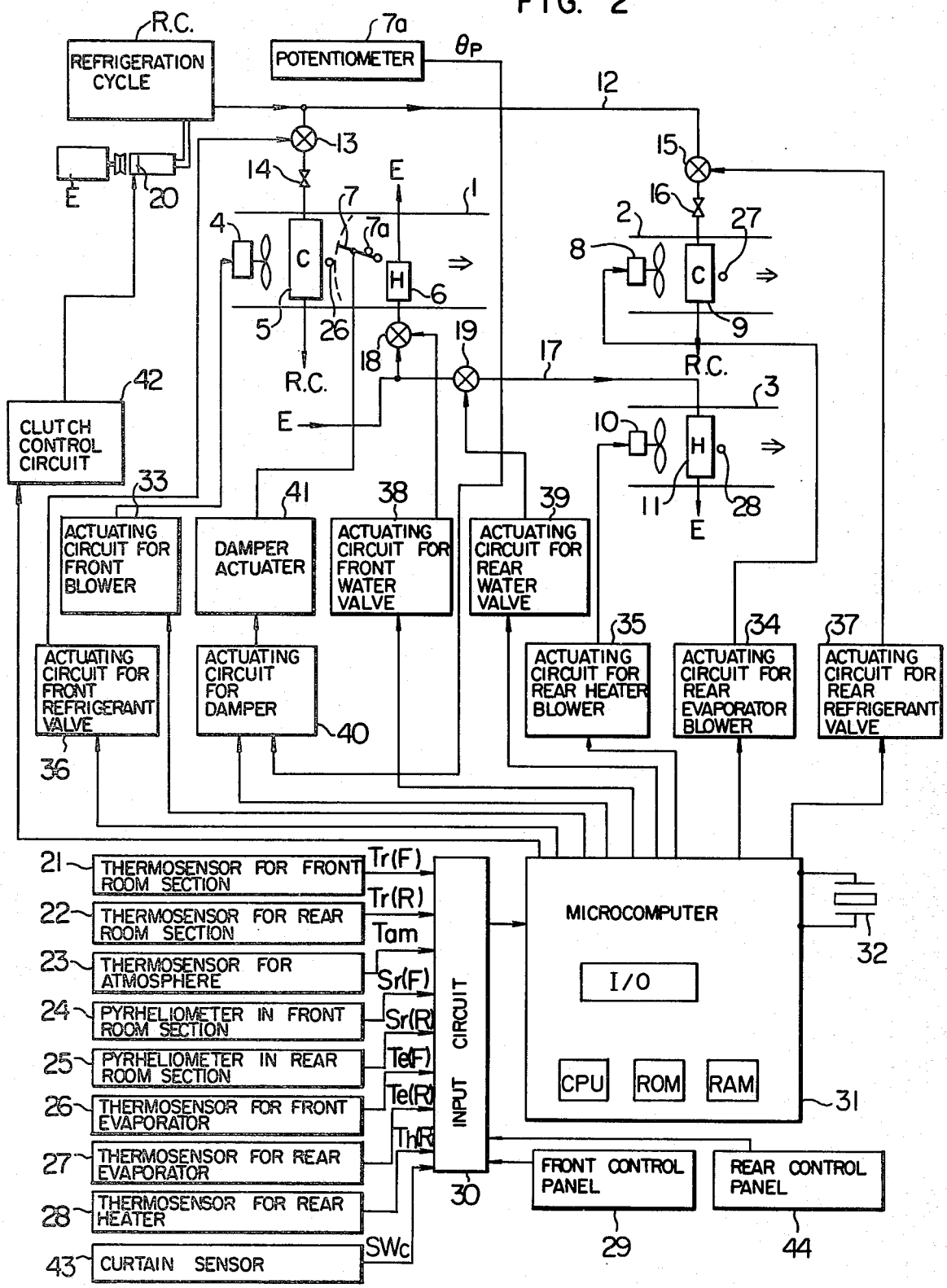
FIG. 2 is a block diagram showing a construction of one embodiment of the present invention.

The present invention will now be described by way of embodiments with reference to the accompanying drawings. An air conditioning control apparatus according to the present invention is preferably applied to air conditioning units carried in a cab-over wagon or a one-box car as shown in FIG. 1. In FIG. 1, reference numeral 1 denotes an air conditioning unit provided in a front section of a passenger compartment and capable of cooling and heating an interior of the front section, reference numeral 2 denotes an air conditioning unit provided in a rear section of the passenger compartment for only cooling an interior thereof, and reference numeral 3 denotes an air conditioning unit for only heating the interior thereof provided also in the rear section. As shown in FIG. 2, the air conditioning unit 1 comprises a front blower device 4 for blowing an air, a front evaporator 5 for cooling the blown air, a heater core 6 for heating the blown air, an air mixing damper 7 for adjusting a ratio heated air to cooled air and a potentiometer 7a (not shown) for detecting an opening degree of the damper. The air conditioning unit 2 includes a rear blower 8 for blowing an air and a rear evaporator 9 for cooling the blown air. The air conditioning unit 3 includes a rear blower 10 for blowing an air and a rear heater core 11 for heating the blown air. In FIG. 2, reference numeral 12 denotes a high pressure line for connecting a refrigeration cycle (R.C.) with the respective evaporators 5 and 9. The high pressure line 12 is provided with a front cooling medium valve (solenoid valve) 13 and an expansion valve 14 for controlling the cooling medium flow to the front evaporator 5 and with a rear cooling medium valve (solenoid valve) 15 and an expansion valve 16 for controlling the cooling medium flow to the rear evaporator 9. Reference numeral 17 denotes a water line through which an engine cooling water fed by a water pump (not shown) passes. The water line 17 is provided therein with water valves (solenoid valves) 18 and 19 for controlling the engine cooling water (hot water) flows to the front heater core 6 and the rear heater core 11. Reference numeral 20 denotes a magnetic clutch for selectively coupling a compressor disposed in the refrigeration cycle (R.C.) to an automotive engine (E) to thereby actuate the compressor.

Reference numerals 21 and 22 denote thermosensors for detecting temperatures Tr (F) and Tr (R) in the front and rear sections of the passenger compartment and generating signals corresponding to the detected temperatures. The thermosensors 21 and 22 are located to sunless portions of the front and rear sections respectively. Reference numerals 23, 24 and 25 denote the respective thermosensors for detecting an ambient temperature Tam, and solar radiation values Sr (F) and Sr (R) at the front and rear section of the passenger compartment. The air conditioning units 1 to 3 and the sensors 21 to 25 are located as shown in FIG. 1.

Reference numerals 26, 27 and 28 denote the respective thermosensors for sensing a blown air temperature Te (F) of the front evaporator 5, a blown air temperature Te (R) of the rear evaporator 9, and a blown air temperature Th (R) of the rear heater core 11. The thermosensors generate signals corresponding to the respective temperatures.

Reference numeral 43 denotes a sensor, for example, a limit switch for detecting whether a curtain 433 for partitioning the passenger compartment into two sections is closed to make the front and rear portions independent to each other as shown in FIG. 1 or opened to make the front and rear portions to be a single space. The limit switch generates an output signal SWc in accordance with curtain condition. Since a thermal load of a space to be air-conditioned when the curtain is opened is different from that when the curtain is closed, it is necessary to change a capacity of each air conditioning means in response to the conditions of the thermal load in order to maintain the passenger compartment at a set temperature. The sensor 43 is used as a sensor for detecting these conditions. It is considered that when the front and rear air conditioning means are simultaneously operated, an effect to the thermal load due to the opening and closing of the curtain is relatively small in comparison with the case where the front and rear air conditioning units are individually operated. Therefore, in this case, the change-over of the air conditioning capacity in view of the opening and closing of the curtain would not be done, as later described. However, in order to more exactly control the compartment temperature, it is possible to vary the air conditioning capacity as desired. The laterally slidable curtain and the vertically slidable curtain are both available as the curtain 433.

Figure 3A:
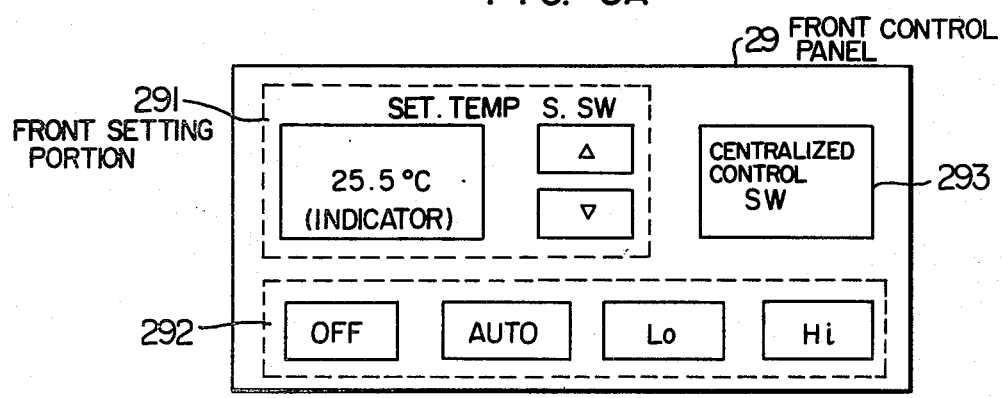
FIGS. 3A and 3B are plan views showing front and rear control panels, respectively.

Reference numeral 29 denotes a front control panel which is shown in FIG. 3A. The front control panel 29 is provided with a compartment temperature setting portion 291 having a digital indicator for indicating a set temperature of the front compartment section and switches for varying the set temperature, a mode selection switch portion 292 for determining an operating condition (mode) of the front blower, and a centralized control switch 293 for determining whether the centralized control for the rear air conditioning units 2 and 3 is carried out or not.

Figure 3B:
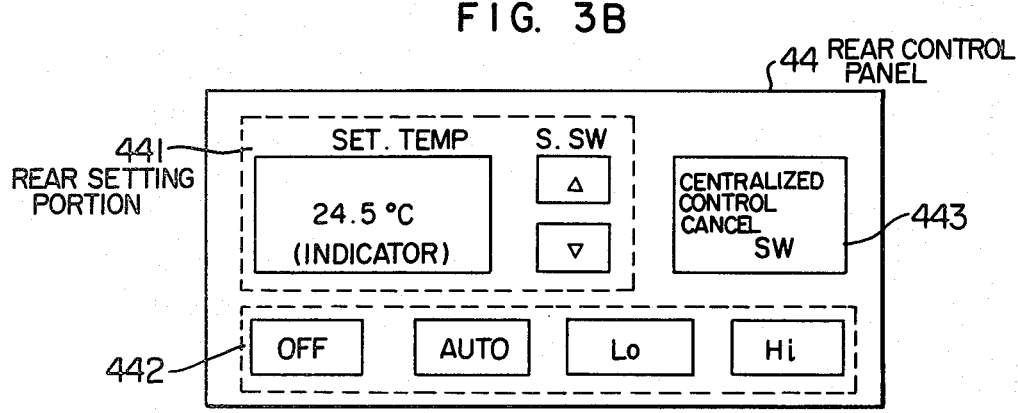

Reference numeral 44 denotes a rear control panel. As shown in FIG. 3B, the rear control panel 44 is provided with a compartment temperature setting portion 441 having a digital indicator for indicating a set temperature of the rear compartment section and switches for varying the set temperature, a mode selection switch portion 442 for determining an operating mode of the rear blower, and a switch 443 for cancelling a centralized control of the rear air conditioning unit which is attained by the centralized control switch 293 of the front control panel 29. Each of the above described switches is of a momentary push type. By operating of the selection switch portions 292 and 442 each blower is operated in a mode selected from four kinds of modes, i.e., stop (OFF), automatic control (AUTO), low speed operation (Lo) and high speed operation (Hi). Also, it is possible to provide an operating lever to the front control panel 29 for switching blower modes of the front air conditioning means 1.

Reference numeral 30 denotes an input circuit having an analog-to-digital converter (A/D converter) for digitalizing output signals or data from the control panels and the above described sensors. Through the input circuit, the digitalized data are fed to a microcomputer 31.

The microcomputer 31 is of a single chip type, which processes operations in accordance with a control program stored in advance and to which a quartz oscillator 32 of several MHz is connected. At the same time, the microcomputer is energized by an electric power having a stabilized constant voltage generated by a stabilizer (not shown) which is supplied from an automotive battery.

The microcomputer 31 is of a single LSI chip mainly composed of a ROM for storing therein a control program, a CPU for processing in accordance with the control program stored in the ROM, a RAM for temporarily storing various data, an I/O circuit for processing output and input signals, and a clock generator for generating reference pulses for the respective elements. The output signals from the sensors, the control panel and the like are processed by the microcomputer 31 in steps such as calculations, decisions and the like in accordance with the control program. The microcomputer feeds command signals to respective actuating circuits subsequently described.

Reference numerals 33, 34 and 35 denote circuits for supplying the blowers 4, 8 and 10 with powers in accordance with the command signals from the computer 31. In these supplying circuits, the digital code command signals from the microcomputer 31 are converted into analog voltages by which a base bias of each power transistor is varied to thereby amplify a current of collector of the power transistor and to thereby vary continuously a rotational speed of a blower motor as a collector load of the power transistor. Reference numerals 36 to 39 denote circuits for selectively feeding command signals to open the respective normally closed solenoid valves consisting of the cooling medium valves 13 and 15 and water valves 18 and 19 in accordance with the command signals from the microcomputer 31. Reference numeral 40 denotes a circuit for feeding an output signal to a damper actuator 41 composed of a motor and a link mechanism for varying an opening degree of the air mixing damper 7 or of a solenoid valve and a diaphragm for changing over the engine vacuum and the atmospheric pressure. In the circuit 40, the digital signal from the microcomputer 31 is converted into an analog voltage which is compared with the output signal of a potentiometer 7a indicative of the opening degree of the damper 7. The command signal corresponding to the difference therebetween is fed into the damper actuator 41 to drive the damper 7 so that the temperature of the air blown from the air conditioning unit 1 becomes a desired temperature calculated in the microcomputer 31. Reference numeral 42 denotes a clutch control circuit for controlling engaging or disengaging of a magnetic clutch 20 in accordance with the command signal from the microcomputer 31.

The primary construction according to the present invention has been described above. It is possible to provide a sucking and blowing manual change-over mechanism for the air conditioning unit which, per se, does not form a primary part of the present invention and to which a well-known technique is applicable.

Figure 4:
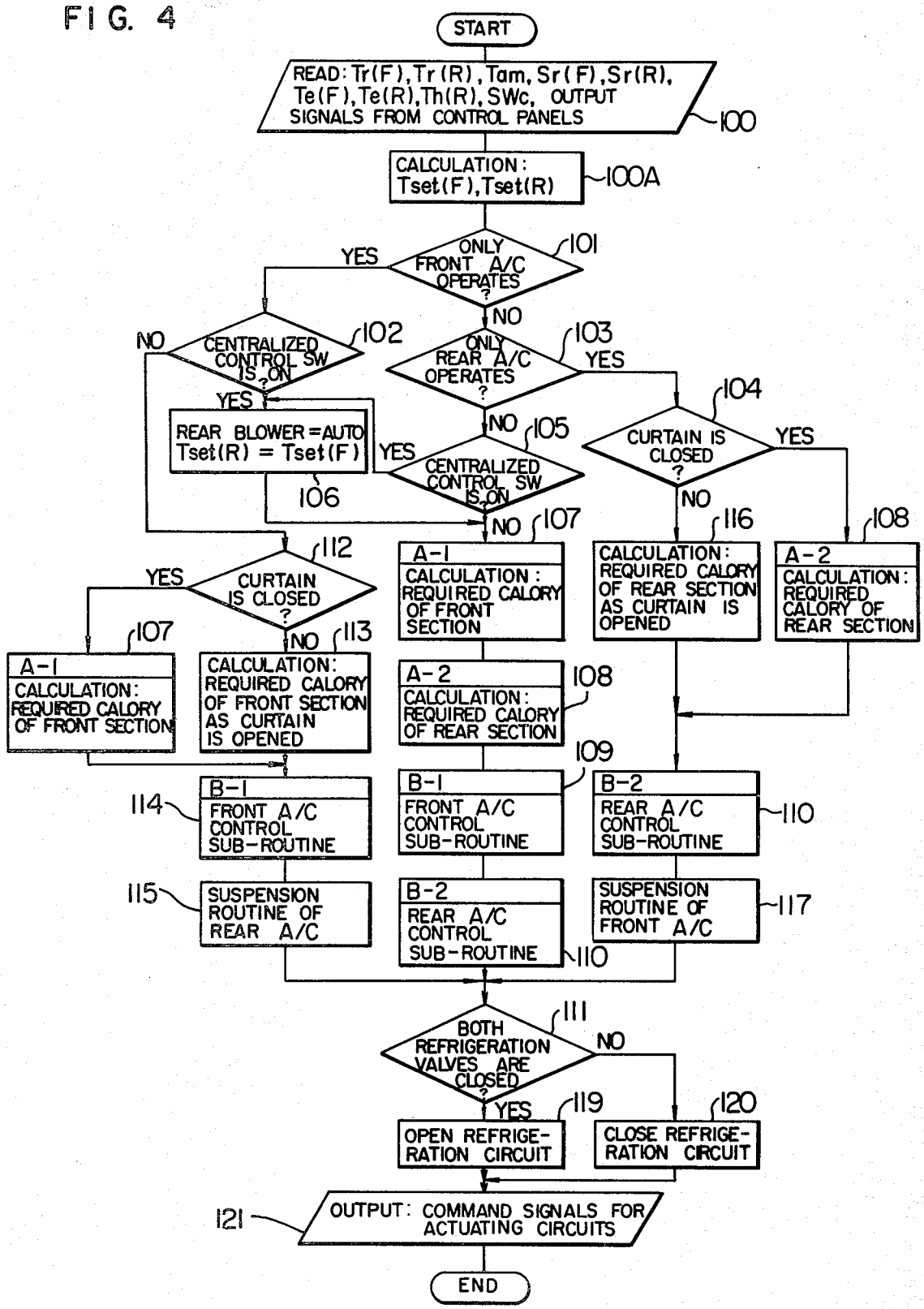
FIG. 4 is a flow chart showing a control program stored in the microcomputer shown in FIG. 2.
Figure 5:
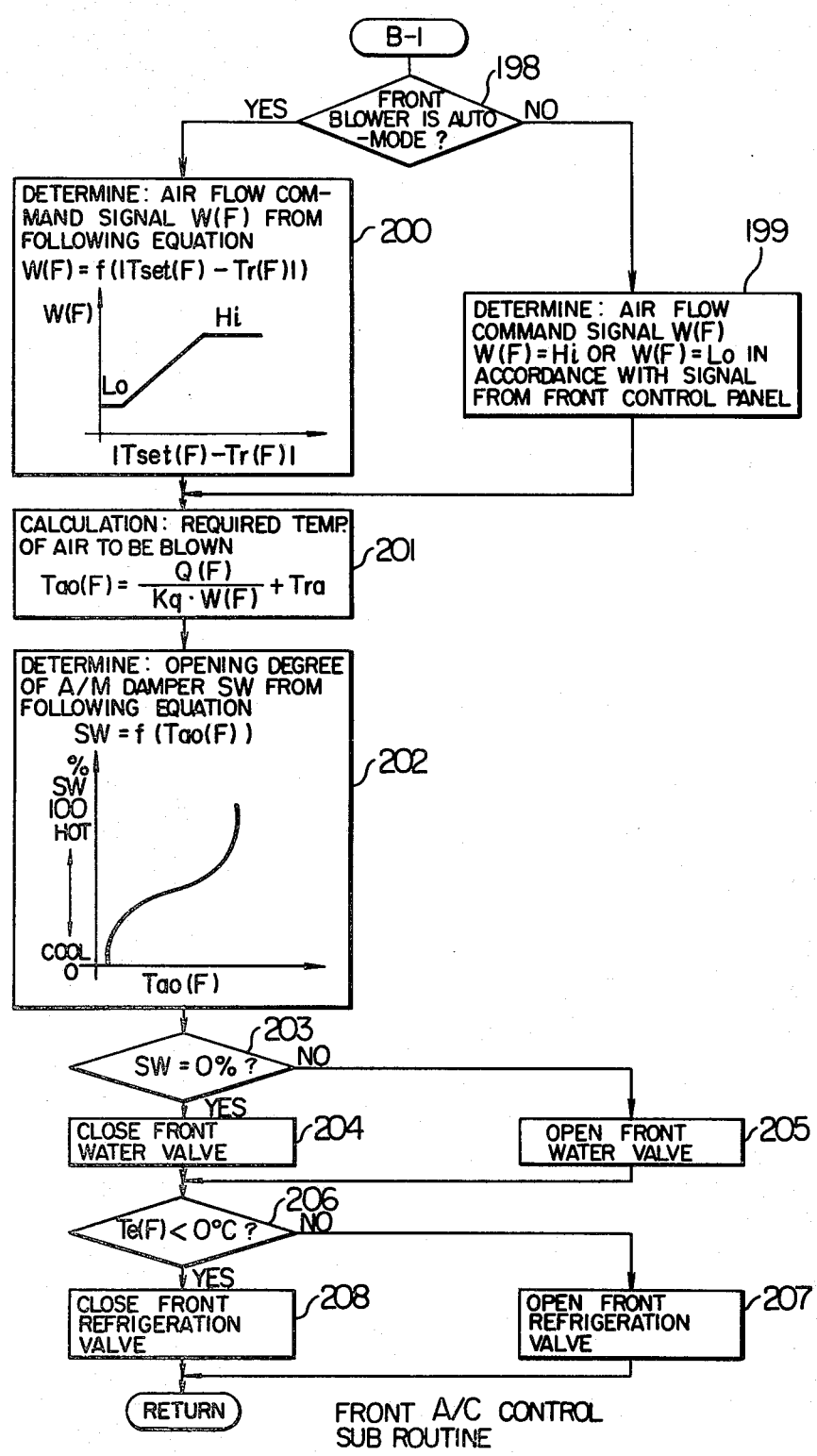
FIGS. 5 and 6 are flow charts showing programs of the sub-routines B-1 and B-2 shown in FIG. 4, respectively.
Figure 6:
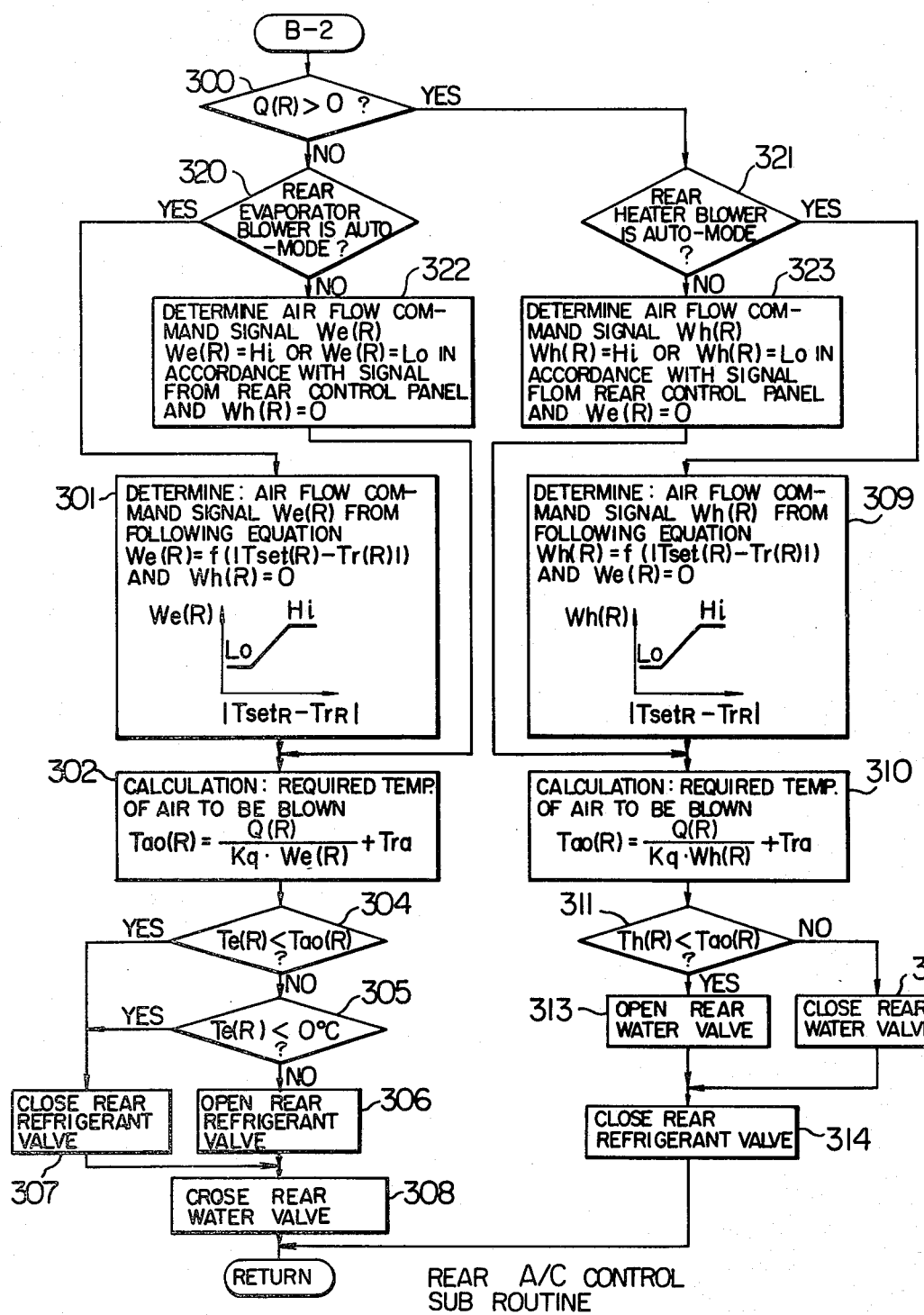

The operation of the abovementioned control apparatus will now be described hereinafter with reference to the flow charts shown in FIGS. 4 to 6. FIG. 4 shows a main flow chart of an air conditioning control program stored in the microcomputer 31. When the air conditioning unit is operated by the front or rear control panel, processes of the control program will be run. Namely, at the first, the RAM is initialized and the processes of steps 100 to 121 are repeatedly conducted by a cycle of several hundreds mm seconds.

In the step 100, the signals from the sensors and the control panels are in order inputted into the microcomputer 31 through the input circuit 30 and are stored in the RAM. In such a state, when the centralized control switch 293 in switched on, a centralized control flag is set, and when the centralized control cancel switch 443 is switched on, the centralized control flag is reset. The centralized control flag is used in the decision steps 102 and 105 later described.

Next, in a set temperature calculation routine step 100A, the set temperature is renewed in accordance with the operation data of the set temperature varying switches of the control panel 29 and 44 stored in the step 100. More specifically, once the set temperature varying switch is pushed, a unit temperature (in this case, 0.5° C.) is added to or subtracted from the predetermined set temperature Toset (F), Toset (R) so that the front set temperature Tset (F) and the rear set temperature Tset (R) are determined and stored into the RAM. When the temperature varying switch is pushed further, the set temperature is renewed and stored. The stored set temperatures Tset (F) and Tset (R) on the Celcius scale are indicated by decimal digit on the digital indicators of the respective compartment temperature setting portions 291 and 441.

In the next step 101, it is determined whether the mode selection switch 292 of the front control panel is OFF-mode or not, that is, whether only the front air conditioning unit is commanded to operate by the front panel 29. If YES, the step 102 is selected and if NO, the step 103 is selected. In the step 103, it is determined whether only the rear air conditioning unit is commanded to operate by the rear control panel 44. If YES, the step 104 is selected, and if NO, the step 105 is selected. When both of the selection switches on the front and rear control panels are in the modes other than the OFF-mode, i.e., the front and rear air conditioning units are simultaneously operated, the step 105 is executed.

In the step 105, it is decided whether the centralized control switch 294 is switched on or not, that is, whether or not the rear air conditioning units 2 and 3 are not controlled by the rear control panel 44 but by the front control panel 29. In the case that centralized control becomes effective, the step 106 is selected and when NO, a front required calory calculation sub-routine of the step 107 is selected.

As has been described above, in the steps 101, 102, 103 and 105, three control modes are determined. As a result, following three loops are executed respectively.

The loop 1 (steps 112 to 115) is used for the front air conditioning control. In this case, the front air conditioning unit 1 is only operative to thereby carry out the air conditioning.

The loop 2 (steps 107 to 110) is used for controlling both the front and rear air conditioning units. The front and rear air conditioning units 1, 2 and 3 are actuated to carry out the temperature adjustment. In this case, it is determined by the operations of the centralized control switch 294 of the front control panel and the centralized control cancel switch 443 of the rear control panel, whether the rear air conditioning units 2 and 3 and the front air conditioning unit 1 are under centralized control or the rear air conditioning units 2 and 3 and the front air conditioning unit 1 are individually controlled.

Under the centralized control, in step 106, the operation mode of the blowers 8 and 10 of the rear air conditioning units 2 and 3 are set in AUTO and stored. Further, the value of front set temperature Tset (F) is stored as a value of the rear set temperature Tset (R). For this reason, in the loop 2, the respective air conditioning units are controlled so that the room temperature becomes a temperature set in the front control panel 29.

Under the individual control, the step 106 is jumped and the front compartment section to be air-conditioned by the front air conditioning unit 1 and the rear compartment section to be air-conditioned by the rear air conditioning units 2 and 3 are respectively air-conditioned so as to be maintained at the respective set temperatures Tset (F) and Tset (R).

The loop 3 (steps 104 to 117) is used for the rear air control. In this case, only the rear air conditioning units 2 and 3 are actuated to carry out the air conditioning.

In case that only one of the two compartment section is desired to be air-conditioned, not only the one compartment section is air-conditioned by cooled or heated air from the air conditioning unit disposed in the one compartment section but also the other section which is not desired to be air-conditioned is actually air-conditioned. Namely, a thermal loss is caused. In view of this drawback, according to this embodiment of the invention, the front compartment section and the rear compartment section may be partitioned by the transparent or semitransparent curtain 433 having a relative high anti-air permeability. Therefore, when the curtain 433 is closed, a heat leaking from one compartment section to the other one i.e., a thermal loss is negligible in comparison with the case that the curtain is opened.

The above described loops 1 to 3 will now be detailed hereinafter.

First of all, in the step 107, a calory Q (F) which is required to bring a temperature of the interior of the front compartment section to a set compartment temperature is calculated by the equation (A-1). In the next step 108, a calory Q (R) which is required to bring a temperature of the interior of the rear compartment section to a set compartment temperature is calculated by the equation (A-2).

$$Q(F) = Kq \cdot Wo(F)[Kset(F) \cdot Tset(F) - Kr(F) \cdot Tr(F) - Ks(F) \cdot Sr(F) - Kam(F) \cdot Tam + C(F) - Tr(F)] \quad (A-1)$$

$$Q(R) = Kq \cdot Wo(R)[Kset(R) \cdot Tset(R) - Kr(R) \cdot Tr(R) - Ks(R) \cdot Sr(R) - Kam(R) \cdot Tam + C(R) - Tr(R)] \quad (A-2)$$

where, Kq, Wo (F), Wo (R), Kset (F), Kset (R), Kr (F), Kr (R), Ks (F), Ks (R), Kam (F), Kam (R), C (F) and C (R) are constants which are defined by physical characteristics of air, a body construction of the vehicle and the like. These constants are derived as a matter of practice from experimental results of actual cars in order to obtain suitable temperature controls in the compartment sections partitioned by the curtain 433.

The next step 109 includes a sub-routine (B-1) for determining a command signal to be fed to the respective drive circuit in order to blow out an air at a required front blow-out temperature Tao (F) from the front air conditioning unit 1. Its detail is shown in FIG. 5. When a process is advanced to this sub-routine, the process is started from the step 198. In the step 198, it is determined whether the front blower mode selection switch 292 is in the AUTO mode or not. As a result, if YES, step 200 is selected. To the contrary, if NO, step 199 is selected, in which the value determined by manual selection in the front selection switch 292 is assigned to a value of the front blown air flow command signal W (F). In the AUTO mode, the blown air flow command signal W (F) is automatically calculated in step 200 by a difference between the front compartment set temperature Tset (F) and the front compartment temperature Tr (F). Namely, the blown air flow command signal W (F) is calculated by an arithmetic expression written in the ROM in advance so that the greater the temperature difference is, the higher the blown air blow command signal W (F) becomes. Subsequently, in step 201, the blown air temperature Tao (F) required to obtain the required calory Q (F) under the determined air amount W (F) is calculated and the opening degree Sw of the air mixing damper 7 required to obtain the blown air temperature Tao (F) is determined in next step 202. Subsequent steps 203 to 205 relate to the front water valve control. When the opening degree Sw of the damper 7 is at 0% (Max. cool), i.e., the heater core 6 is to be closed by the damper 7, the water valve 18 is to be closed whereas when the opening degree SW exceeds 0%, the valve 18 is to be opened. In next steps 206 to 208, a command signal for controlling the front cooling medium valve 13 is determined in order to obtain a desired blown air temperature Tao (F) without frosting the front evaporator 5. Namely, it is determined whether the blown air temperature Te (F) from the front evaporator 5 is less than 0° C. or not. When it is below 0° C., the valve 13 is to be closed whereas when above 0° C., the valve 13 is to be opened.

The above described sub-routine is executed and the next step 110, i.e., rear air conditioning sub-routine (B-2) is sequentially to be executed. The sub-routine (B-2) is shown in detail in FIG. 6. First of all, it is decided in step 300 whether a rear required calory Q (R) is positive or negative, that is, whether desired is a heating or a cooling. When the cooling is desired, step 320 is selected whereas when the heating is desired, step 321 is selected. In the step 320, it is decided whether the rear blower is in the AUTO mode or not. When in the AUTO mode, the step 301 is selected whereas when not in the AUTO mode, the step 322 is selected. In step 322, the value determined in the rear control panel 44 is assigned to the value of the rear cooler blower air flow command signal We (R) and at the same time a zero is assigned to the rear heater blown air flow command signal Wh (R) in order to stop the operation of the heater blower. Then, step 302 is to be executed. In the AUTO mode, in step 301, the blown air flow command signal We (R) is automatically determined by a difference between the set compartment temperature Tset (R) and the rear compartment temperature Tr (R). In the next step 302, under the determined air flow We (R), the blown air temperature Tao (R) required to obtain a required calory Q (R) is calculated. In the further steps 304 to 307, a command signal for controlling the rear cooling medium valve 15 is determined in order to obtain a desired blown air temperature Tao (R) without frosting the rear evaporator 9. Namely, when the blown air temperature Te (R) from the rear evaporator 9 is lower than the desired blown air temperature Tao (R) calculated above, the rear cooling medium valve 15 is closed. Inversely, when the temperature Te (R) is higher than the desired temperature Tao (R), it is judged whether the rear evaporator 9 is to be frosted or not; that is, whether or not the value Te (R) is equal to or lower than 0° C. If so, the valve 15 is demanded to be closed whereas if not, the valve 15 is demanded to be opened. After this process, in order to stop the running of the hot water which is not necessary for cooling, the rear water valve 19 is to be closed.

On the other hand, in the step 300, when it is decided that the heating is desired, the processes after step 321 are to be executed. First of all, in steps 321, 323 and 309, it is decided whether the rear blower is in the AUTO or not. In compliance with the results, a rear heater blown air flow command signal Wh (R) is determined in the same manner as explained in the steps 322 and 301, and at the same time, a zero is assigned to the rear cooler blown air flow command signal We (R) in order to stop the rear cooler blower which is unnecessary for heating. Then, in the next step 310 is effected, a desired blown air temperature Tao (R) for the air conditioning unit 3 is calculated. The rear water valve 19 is controlled in compliance with the following steps 311 to 313 in order to obtain the blown air temperature Tao (R). Namely, when the blown air temperature Th (R) from the rear heat 11 is lower than the desired blown air temperature Tao (R), the valve 19 is to be opened, whereas the temperature Th (R) is higher than Tao (R), the valve 19 is to be closed. After the process, in order to prevent an unnecessary cooling, the rear cooling medium valve 15 is closed in the step 314. Thus, the sub-routine (B-2) is executed and sequentially steps 111, 119 and 120 are to be executed.

These steps 111, 119 and 120 constitute a clutch control routine shown in FIG. 4. In this routine, when both the front and rear cooling medium valves 13 and 15 are closed, since it is unnecessary to operate the compressor, the clutch 20 is released to the compressor from the engine. When, however, at least one of the valves 13 and 15 is opened, the clutch 20 is commanded to engage the compressor with the engine so as to operate the refrigeration circuit. In the subsequent step 121, the command signal of the opening degree of the air mixing damper, the air flow rates of respective blowers, ON and OFF operations of the valves, and the like, which have been determined through the previous processes are outputted to the respective drive circuits 33 to 40 and 42.

As described above, the front air conditioning unit 1 and the rear air conditioning units 2 and 3 are simultaneously or individually controlled and may be effectively operated so as to maintain the interiors of the compartment sections at the set compartment temperatures and air flow modes indicated in the front control panel 29 and the rear control panel 44.

An operation in which the centralized control switch 293 of the front panel 29 is switched on will now be explained. When a centralized control is executed by switch 293 and a centralized control signal is fed to the microcomputer 31, in the step 105 in FIG. 4 it is decided whether the centralized control is executed or not. If YES, the process of step 106 is carried out, in which the front set temperature Tset (F) is assigned to the rear set compartment temperature Tset (R) and simultaneously the rear blower mode is also assigned in AUTO. Then, the step 107 is executed so that the above described process is attained. Therefore, under the centralized control, the front and rear compartment sections are both controlled so as to maintain therein at the set temperature by the front control panel. At this time, the set temperature indicated on the rear control panel 44 is the same value as that indicated in the front control panel, and the rear blower mode is AUTO. In this case, in practice, the switching operations of the blower selection portion 442 and the setting portion 441 do not cause any effect on the rear air conditioning units 2 and 3 at all. In order to cancel the centralized control, it is sufficient that the switch 443 is merely pushed. It may be possible, as desired, to cancel it by operating any one of switches of the rear control panel 44 instead of use of the switch 443.

And then, an operation in which the only front air conditioning unit 1 is started by the front control panel 29 (i.e., the rear blower mode is OFF) will now be explained.

This operation corresponds to the processes of the steps 101 and 102 in FIG. 4. In the step 102, decided is whether the centralized control is carried out or not. When YES, the step 106 is selected to thereby control the front and rear air conditioning units 1 to 3 by means of the front control panel 29 as described before. When the centralized control is not carried out, the step 112 is executed to decide whether or not the front and rear sections are partitioned by the curtain 433. This decision is conducted by the sensor 43. When the curtain is closed, a required calory Q (F) is calculated by the front required calory calculating expression (A-1) in the step 107. The opening degree of the air mixing damper and the opening and closing of each valve are controlled by the front air conditioning control sub-routine (B-1) in subsequent step 114. Then, the rear air conditioning suspension routine 115 is processed and the step 111 is subsequently executed. More specifically, in the step 115, a command signal is set so that the rear blowers 8 and 10 are stopped and the valves 15 and 19 are closed.

When the curtain is opened, the front air conditioning unit 1 is operated to effect cooling not only the front compartment section but also at least part of the rear compartment section. Namely, a thermal load which the front air conditioning unit 1 must support is unduly increased. Therefore, the calory required to air condition the increased thermal load must be greater than the calory Q (F) calculated in the step 107. Namely, constants of the arithmetic expression (A-1) must be changed so as to obtain the calory greater than Q (F). In other words, when the curtain is opened, in a step 113 the required calory Q' (F) is obtained by a modified arithmetic expression and the step 114 is subsequently executed.

As is clear from the foregoing, when the air conditioning units are started by the front panel 29 (i.e., the rear blower mode is OFF), it is possible to control the rear air conditioning unit by means of the front panel. Also, when only the front air conditioning unit is operated, since the air conditioning capacity is automatically controlled in accordance with the position of the curtain which partitions passenger compartment into the front and rear compartment sections, it is possible to always maintain the front compartment section temperature at the set compartment temperature.

Subsequently, the following description will be made to a process of the loop 3 in which only the rear air conditioning units are operated (i.e., the front blower mode is OFF); that is, the rear air conditioning units 2 and 3 are operated by the rear control panel 44. A rear required calory Q (R) is obtained in the steps 104, 108 and 116 in compliance with the position of the curtain, in like manner described in the description of the loop 1. In the step 110, the air conditioning units 2 and 3 are controlled to maintain the interior of the rear compartment section at the set compartment temperature. In the step 117, a process for stopping the front air conditioning unit 1 is carried out and subsequently the step 111 is executed. The calory calculation equation used in the step 116 and the rear calory calculation equation (A-2) used in the step 108 are substantially the same one except that the constants such as Kset (R), C (R) and the like are modified. A specific object of the step 118 is to set a command signal so as to close the valves 13 and 18 and to stop the front blower 4. Accordingly, the rear air conditioning unit 23 is controlled by the rear control panel 44.

Incidentally, it is possible to carry out other processes of the control of air conditioning, such as change-over operation of the blowout and suction of the front air conditioning unit 1.

Figure 7:
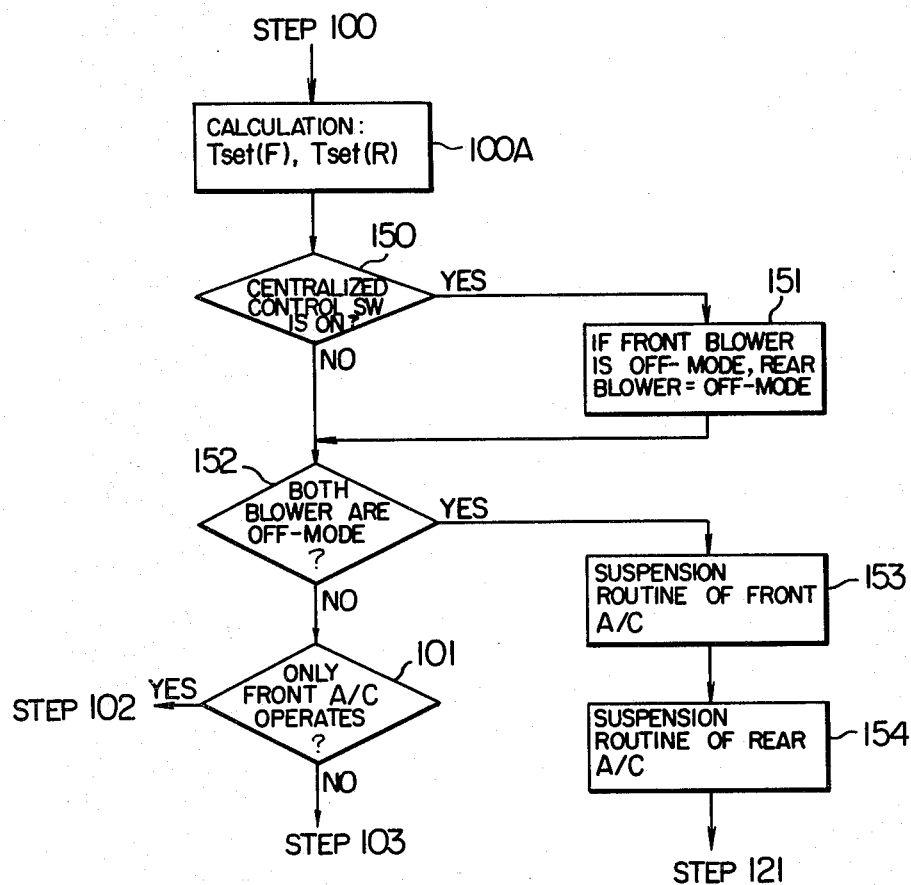
FIG. 7 is a flow chart showing a characterizing part of a control program stored in a microcomputer of another embodiment.

It is also possible to add further steps 150 to 154 shown in FIG. 7 after the step 100A shown in FIG. 4. In the step 150, it is decided whether the centralized control flag is set or not. If YES, the step 151 is selected and if NO, the step 152 is selected.

In the step 151, when the front blower mode is in the OFF mode, the rear blower mode is also set in the OFF mode, whereas in the step 152, when both the front and rear blower modes are in the OFF mode, the steps 153 and 154 are selected so that each output signals are determined to stop the operations of the front air conditioning unit and the rear air conditioning units. Then, the step 121 is executed.

In the step 152, when both of the front and rear blower modes are not in the OFF mode, the step 101 is executed. It should be noted that the steps 153 and 154 have the same operations as those of the steps 118 and 115.

According to the present invention, the following modifications are possible.

(1) It is possible, for example, to provide a suitable hysteresis for preventing the hunting and for stabilizing the control, to the steps 203, 206, 300, 304, 305 and 311.

(2) If the blower modes are all in the AUTO mode, it is possible to use values of the required calory (Q (F), Q (R)) of each air conditioning unit to determine the air flow of each blower, instead of using the difference between the set temperature and the actual temperature of the compartment section.

(3) Instead of controlling the blown air temperature of the cooling air conditioning unit 2 according to the opening or closing of the cooling medium valve 15, and evaporator pressure regulator (EPR) or the like may be used in which the set pressure may be varied. Also, instead of controlling the blown air temperature of the heating air conditioning unit 3 according to the opening or closing of the hot water valve 19, it is of course possible to control by using the variable flow valve.

(4) It is possible to remove the centralized control cancel switch 443 from the rear control panel 44. Namely, for example an operation in which the mode except for the OFF mode is selected in the rear blower mode selection switch 442 is inputted into the computer 31 by which the decision is made and the centralized control is cancelled.

As described above, according to the present invention, a single digital microcomputer permits the air conditioning units 1 to 3 inclusive to operate effectively in compliance with the thermal load of the compartment section to be air-conditioned, each compartment section may be automatically controlled under a suitable temperature. When once the desired temperature is set, the further process will be automatically executed in compliance with the program stored in the microcomputer, so any troublesome manual operation is not required.

Also, since the two sections to be air-conditioned are centralizedly controlled with the single temperature set portion, it is further facilitated to manipulate the switch.

Furthermore, since the cooling and heating are automatically controlled in response to the thermal load of the sections to be air-conditioned, the heat loss is optimally reduced. This unit that in the application to, for example, a car air conditioning unit of type in which the cooling water for the automotive engine is used as heating water and the revolution drive power of the engine is used for cooling, a load greater than necessary is not imposed on the engine.

What is claimed is:

1. A control apparatus for controlling air conditioning means disposed in a passenger compartment of a motor vehicle including two compartment sections, said air conditioning means being provided with a first air conditioning unit being located in a first compartment section and having variable cooling and heating capacities, a second air conditioning unit being located in a second compartment section and having variable cooling capacity, and a third air conditioning unit being located in said second compartment section and having variable heating capacity, said control apparatus controlling temperatures of the compartment sections and comprising:

first sensing means for measuring an actual temperature in the first compartment section;
second sensing means for measuring an actual temperature in the second compartment section;
first set means for setting a required temperature in the first compartment section;
second set means for setting a required temperature in the second compartment section;
means deciding the air conditioning units by which said first and second compartment sections are air conditioned;
a microcomputer for receiving at least output signals from the first and second sensing means, the first and second set means, and the deciding means, and for individually outputting a first controlled variable signal and a second controlled variable signal;
actuating means for operating said first air conditioning unit in accordance with the first controlled variable signal from said microcomputer so as to bring actual temperature in the first compartment section close to the required temperature therein; and
actuating means for operating said second or third air conditioning unit in accordance with the second controlled variable signal from said microcomputer so as to bring actual temperature in the second compartment section close to the required temperature therein.

2. A control apparatus adapted to air conditioning unit for a passenger compartment of a motor vehicle including two compartment sections, said air conditioning unit provided with a first air conditioning unit being located in a first compartment section and having variable cooling and heating capacities, a second air conditioning unit being located in a second compartment section and having variable cooling capacity, and a third air conditioning unit being located in said second compartment section and having variable heating capacity, said control apparatus controlling temperatures of the compartment sections and comprising:

first sensing means for measuring an actual temperature in the first compartment section;
second sensing means for measuring an actual temperature in the second compartment section;
first set means for setting a required temperature in the first compartment section;
second set means for setting a required temperature in the second compartment section;
means deciding the air conditioning units by which said first and second compartment sections are air conditioned, and deciding whether the second required temperature equals the first required temperature;
a microcomputer for receiving at least output signals from the first and second sensing means, the first and second set means, and the deciding means, and for selectively outputting a first controlled variable signal, a second controlled variable signal, and a third controlled variable signal; and
first actuating means for operating said first air conditioning unit in accordance with the first controlled variable signal from said microcomputer so as to bring actual temperature in the first compartment section close to the required temperature therein;
second actuating means for operating said second air conditioning unit in accordance with the second controlled variable signal from said microcomputer so as to bring actual temperature in the second compartment section close to the required temperature therein; and
third actuating means for operating said second air conditioning unit in accordance with the third controlled variable signal from said microcomputer so as to bring actual temperature in the second compartment section close to the required temperature in the first compartment section.

3. A control apparatus as in claim 1 or 2, wherein means for partitioning said passenger compartment into said two sections is provided in the passenger compartment and sensing means for detecting whether said passenger compartment is partitioned by said means for partitioning is provided in said control apparatus.

4. A control apparatus for controlling air conditioning means disposed in a passenger compartment of a motor vehicle including two compartment sections, said air conditioning means being provided with a first air conditioning unit being located in a first compartment section and having variable cooling and heating capacities, a second air conditioning unit being located in a second compartment section and having a variable cooling capacity, and a third air conditioning unit being located in said second compartment section and having variable heating capacity, said control apparatus controlling temperatures of the compartment sections and comprising:

first sensing means for measuring an actual temperature in the first compartment section;

second sensing means for measuring an actual temperature in the second compartment section;

first set means for setting a required temperature in the first compartment section;

second set means for setting a required temperature in the second compartment section;

means deciding the air conditioning units by which said first and second compartment sections are air conditioned;

a microcomputer for receiving at least output signals from the first and second sensing means, the first and second set means, and the deciding means, and for individually outputting control signals corresponding to adjustment values of the capacities of said air conditioning units, which are required to bring said actual temperatures in said compartment sections into said set temperatures; and actuating means for operating said air conditioning units in accordance with said control signals from said microcomputer so as to bring said actual temperatures close to said set temperatures.

5. A control apparatus adapted to air conditioning unit for a passenger compartment of a motor vehicle including two compartment sections, said air conditioning unit provided with a first air conditioning unit being located in a first compartment section and having variable cooling and heating capacities, a second air conditioning unit being located in a second compartment section and having variable cooling capacity, and a third air conditioning unit being located in said second compartment section and having variable heating capacity, said control apparatus controlling temperatures of the compartment sections and comprising:

first sensing means for measuring an actual temperature in the first compartment section;

second sensing means for measuring an actual temperature in the second compartment section;

first set means for setting a required temperature in the first compartment section;

second set means for setting a required temperature in the second compartment section;

means deciding the air conditioning units by which said first and second compartment sections are air conditioned, and deciding whether the second required temperature equals the first required temperature;

a microcomputer for receiving at least output signals from the first and second sensing means, the first and second set means, and the deciding means, and for selectively outputting control signals corresponding to adjustment values of the capacities of said air conditioning units, which are required to bring said actual temperatures in said compartment sections into said set temperatures; and actuating means for operating said air conditioning units in accordance with said control signals from said microcomputer so as to bring said actual temperature close to set temperatures.

* * * * *